US012747037B2

(12) United States Patent
Abe et al.

(10) Patent No.: US 12,747,037 B2
(45) Date of Patent: Sep. 29, 2026

(54) SYSTEM AND METHOD FOR CONTROLLING MOBILE NODE GROUP, AND COMMUNICATION DEVICE

(71) Applicant: NATIONAL INSTITUTE OF INFORMATION AND COMMUNICATIONS TECHNOLOGY, Koganei (JP)

(72) Inventors: Yuma Abe, Tokyo (JP); Hideaki Kotake, Tokyo (JP); Morio Toyoshima, Tokyo (JP)

(73) Assignee: NATIONAL INSTITUTE OF INFORMATION AND COMMUNICATIONS TECHNOLOGY, Tokyo (JP)

( * ) Notice: Subject to any disclaimer, the term of this patent is extended or adjusted under 35 U.S.C. 154(b) by 318 days.

(21) Appl. No.: 18/579,631

(22) PCT Filed: May 16, 2022

(86) PCT No.: PCT/JP2022/020328
§ 371 (c)(1),
(2) Date: Jan. 16, 2024

(87) PCT Pub. No.: WO2023/286435
PCT Pub. Date: Jan. 19, 2023

(65) Prior Publication Data

US 2024/0317427 A1 Sep. 26, 2024

(30) Foreign Application Priority Data

Jul. 16, 2021 (JP) ................................. 2021-118291

(51) Int. Cl.
*B64G 1/10* (2006.01)
*H04B 7/185* (2006.01)

(52) U.S. Cl.
CPC ......... *B64G 1/1007* (2013.01); *B64G 1/1085* (2013.01); *H04B 7/1851* (2013.01)

(58) Field of Classification Search
CPC ........... H04B 7/18513; H04B 7/18534; H04W 84/06
See application file for complete search history.

(56) References Cited

U.S. PATENT DOCUMENTS

2001/0017849 A1 8/2001 Campanella et al.
2007/0250267 A1 * 10/2007 Jaeger .................. B64G 1/1085 701/531

(Continued)

FOREIGN PATENT DOCUMENTS

JP 2001523916 A 11/2001
JP 2008176250 A 7/2008

(Continued)

OTHER PUBLICATIONS

Extended European Search Report (EESR) dated Apr. 23, 2025, issued in counterpart European Application No. 22841782.0.

(Continued)

*Primary Examiner* — Curtis A Kuntz
(74) *Attorney, Agent, or Firm* — Holtz, Holtz & Volek PC

(57) ABSTRACT

To control a mobile node group that performs a formation flight, mobile nodes constituting the mobile node group and a ground station that wirelessly communicates with each of the mobile nodes are included. The mobile nodes are classified into a follower mobile node and a leader mobile node that collects information on the follower mobile node and controls the follower mobile node. The mobile nodes wirelessly communicate with one another based on beamforming or MIMO. Based on an installed on-board processor, the leader mobile node controls the follower mobile node, and the mobile node controls a position or an attitude of the mobile node itself for performing the formation flight. The ground station performs link control of the wireless com- (Continued)

munication with the mobile node or link control of the wireless communication between the mobile nodes, and control of selecting any ground station that wirelessly communicates with the mobile node.

10 Claims, 17 Drawing Sheets

(56) References Cited

U.S. PATENT DOCUMENTS

| | | | | |
|---|---|---|---|---|
| 2016/0134358 | A1* | 5/2016 | Jalali .................... | H04B 7/2041 455/11.1 |
| 2018/0074520 | A1* | 3/2018 | Liu .......................... | G08G 5/25 |
| 2018/0359022 | A1 | 12/2018 | Avellan et al. | |
| 2019/0238216 | A1 | 8/2019 | Avellan et al. | |

FOREIGN PATENT DOCUMENTS

| | | | | |
|---|---|---|---|---|
| JP | 2019001446 | A | 1/2019 | |
| JP | 6506365 | B2 | 4/2019 | |
| JP | 2020032874 | A | 3/2020 | |
| KR | 102267764 | B1 | 6/2021 | |
| WO | WO-2009003451 | A1 * | 1/2009 | ............... B64G 1/24 |

OTHER PUBLICATIONS

Zhu, et al., "Deep-Learning-Based Multiple Beamforming for 5G UAV IoT Networks", IEEE Network, vol. 34, No. 5, Sep. 18, 2020, pp. 32-38.

International Search Report (ISR) (and English language translation thereof) dated Jul. 5, 2022, issued in International Application No. PCT/JP2022/020328.

Written Opinion dated Jul. 5, 2022, issued in International Application No. PCT/JP2022/020328.

* cited by examiner

SYSTEM AND METHOD FOR CONTROLLING MOBILE NODE GROUP, AND COMMUNICATION DEVICE

TECHNICAL FIELD

The present invention relates to a mobile node group control system and method, and a communication device for controlling a mobile node group that performs a formation flight, and especially relates to a mobile node group control system and method, and a communication device appropriate for flexibly controlling a communication link corresponding to a service requirement.

BACKGROUND ART

In the conventional satellite communication field, it has been the mainstream to launch a large satellite to a geostationary earth orbit and operate it. On the other hand, in the satellite communication field in recent years, from the aspect of production costs and launch costs, small satellites that can be developed at low cost tend to be used. However, in the small satellites, the performance for each satellite is limited compared with the large satellite. Therefore, the performance is complemented by establishing a communication network in which a plurality of satellites are coordinated with one another.

Examples of a satellite system for coordinating a plurality of satellites include a satellite constellation and a satellite formation flight.

The satellite constellation is a system in which a plurality of satellites are located on the same orbit so as to have long distances to one another, and operated without controlling relative positions to one another. When the satellite constellation is used as a communication system, since a plurality of satellites globally cover the earth, the communication network can be always provided in an area with no terrestrial network on the earth.

Meanwhile, the satellite formation flight is a system in which a group of satellites are located at short distances to one another compared with the satellite constellation, and relative positions to one another are controlled. With the satellite formation flight, by additionally launching satellites and adding them to a satellite group system, the performance and the service range can be gradually expanded, and it is expected that more flexible operations can be provided. Furthermore, the larger the number of satellite groups becomes, the more the performance of the satellite group is enhanced, and the weight and the power consumption per satellite can be decreased. In order to achieve the satellite formation flight, a technique in which beamforming is applied has been conventionally proposed (for example, see Patent Document 1).

For the achievement of a formation flight of very small satellites, a control method for controlling a relative position and an attitude with a magnetic force has been proposed (for example, see Patent Document 2).

Patent Document 1: Japanese Patent No. 6506365
Patent Document 2: JP-A-2020-32874

DISCLOSURE OF THE INVENTION

Problems to be Solved by the Invention

In current satellite communication systems, a system is designed for each individual service. For example, a system specializing in communication is designed for communication, and a system specializing in observation is designed for observation. Therefore, from the aspect of a user, adjustment with each service provider is necessary for each service for the use of a plurality of services.

Cooperation between satellite communications and terrestrial systems, such as 5G or Beyond 5G, has been examined by a standardization organization, and it is expected that in the future, use cases and usage scenarios of the satellite communications will expand, and services will be diversified in addition to conventional broadband communications. Additionally, users who require services through the satellite communications are expected to increase.

Therefore, in the current approach in which systems specializing in individual services are established, a load of the adjustment with the service provider on the user may increase, and thus there is a high possibility of failing to deal with the future movement. In the prior art of the satellite formation flight, a control configuration of a leader satellite and a follower satellite in a satellite group is determined in advance. Therefore, for example, it is impossible to flexibly deal with a case where a failure occurs in the leader satellite, and the system possibly does not function.

That is, for the achievement of the satellite formation flight, there has been conventionally desired a technique of reducing a load on a user by allowing flexible control of a communication link corresponding to a service requirement instead of designing a specialized system for each individual service each time.

Therefore, the present invention has been made in consideration of the above-described problems, and it is an object of the present invention to provide a mobile node group control system and method, and a communication device capable of reducing a load on a user by allowing flexible control of a communication link corresponding to a service requirement for the achievement of a satellite formation flight.

Solutions to the Problems

A mobile node group control system according to a first invention is a mobile node group control system that controls a mobile node group performing a formation flight. The system includes mobile nodes and a ground station. The mobile nodes constitute the mobile node group. The mobile nodes are classified into a follower mobile node and a leader mobile node that collects information on the follower mobile node and controls the follower mobile node. The mobile nodes wirelessly communicate with one another based on beamforming or MIMO (Multiple-Input and Multiple-Output). The ground station wirelessly communicates with each of the mobile nodes. Based on an on-board processor installed in the mobile node, the leader mobile node controls the follower mobile node, and the mobile node controls a position or an attitude of the mobile node itself for performing the formation flight. The ground station performs link control of the wireless communication with the mobile node or link control of the wireless communication between the mobile nodes, and control of selecting any ground station that wirelessly communicates with the mobile node.

In a mobile node group control system according to a second invention, which is in the first invention, the mobile node performs time synchronization control and mobile node group forming control for forming the mobile node group with another mobile node based on the installed on-board processor.

In a mobile node group control system according to a third invention, which is in the first invention, the ground station performs control of determining a service to be provided to the mobile node, and control of changing a platform of connection from the respective mobile nodes to the ground station, connection from the mobile node group including the respective mobile nodes to another mobile node group, or connection from the mobile node group including the respective mobile nodes to another mobile node.

In a mobile node group control system according to a fourth invention, which is in the first invention, the mobile node performs time synchronization control and mobile node group forming control for forming the mobile node group with another mobile node based on the installed on-board processor, and the ground station performs control of determining a service to be provided to the mobile node, and control of changing a platform of connection from the respective mobile nodes to the ground station, connection from the mobile node group including the respective mobile nodes to another mobile node group, or connection from the mobile node group including the respective mobile nodes to another mobile node.

In a mobile node group control system according to a fifth invention, which is in any of the first invention to the fourth invention, the mobile node is an artificial satellite.

A communication device according to a sixth invention, which is applied to the mobile node group control system according to any of the first invention to the fifth invention, includes an on-board processor installed in the mobile node. The on-board processor performs the control of the follower mobile node by the leader mobile node and the control of the position or the attitude of the mobile node itself for performing the formation flight.

A communication device according to a seventh invention, which is applied to the mobile node group control system according to any of the first invention to the fifth invention, includes control means installed in the ground station. The control means performs the link control of the wireless communication with the mobile node or the link control of the wireless communication between the mobile nodes, and the control of selecting any ground station that wirelessly communicates with the mobile node.

A mobile node group control method according to an eighth invention is a mobile node group control method for controlling a mobile node group that performs a formation flight. The method includes performing control of a follower mobile node by a leader mobile node and control of a position or an attitude of a mobile node itself for performing the formation flight based on an on-board processor installed in the mobile node, the mobile nodes constituting the mobile node group, the mobile nodes being classified into the follower mobile node and the leader mobile node that collects information on the follower mobile node and controls the follower mobile node, the mobile nodes wirelessly communicating with one another based on beamforming or MIMO, and performing link control of wireless communication with the mobile node or link control of the wireless communication between the mobile nodes, and control of selecting any ground station that wirelessly communicates with the mobile node, in a ground station that wirelessly communicates with each of the mobile nodes.

Effects of the Invention

According to the present invention with the above-described configurations, the flexible control of the communication link corresponding to the service requirement can be performed for the achievement of the formation flight of the mobile node group. Accordingly, instead of designing the specialized system for each individual service each time, since the flexible control of the communication link corresponding to the service requirement can be performed, the load on the user can be reduced.

DESCRIPTION OF PREFERRED EMBODIMENTS

The following describes a mobile node group control system to which the present invention is applied in detail with reference to the drawings.

Figure 1:
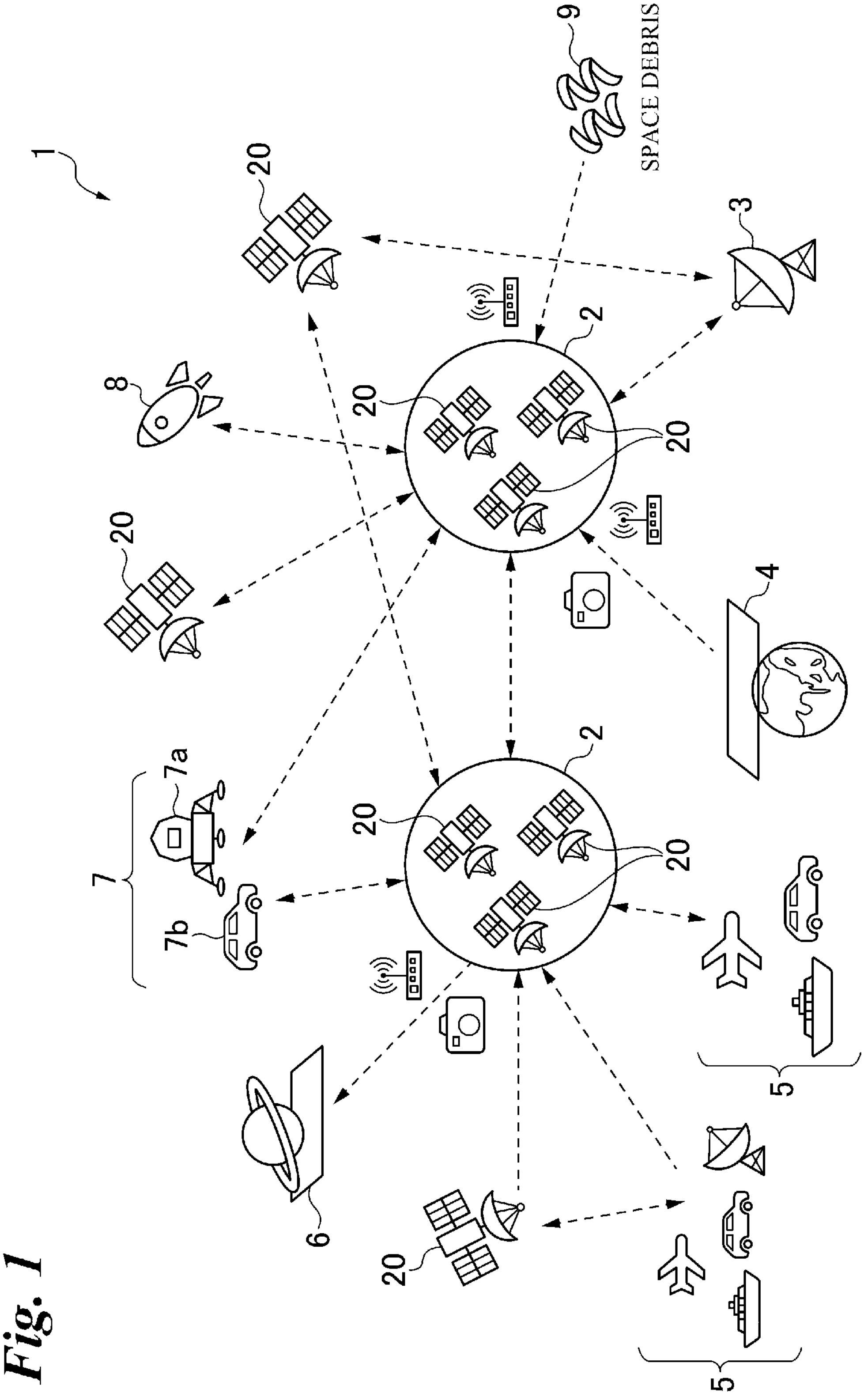
FIG. 1 is a diagram illustrating an overall configuration of a mobile node group control system to which the present invention is applied.

FIG. 1 illustrates an overall configuration of a mobile node group control system 1 to which the present invention is applied. The mobile node group control system 1 includes mobile node groups 2 including a plurality of mobile nodes 20, a ground station 3 configured to perform wireless communication with individual mobile nodes 20 constituting the mobile node groups 2, an earth observation remote sensing system 4, users 5, a deep space observation gravitational wave measurement system 6, a lander 7*a* and a rover 7*b* for exploring the moon and planets, a spaceplane 8, space debris 9, and the like. Each of the mobile nodes 20 constituting the mobile node group 2 is configured to perform wireless communication with another mobile node 20 included in another mobile node group 2, and further configured to perform wireless communication with a single mobile node 20 not included in the mobile node group 2.

The mobile node 20 is an artificial satellite. The artificial satellite applied to the mobile node 20 may have any size, and may be a large satellite, a small satellite, and further a very small satellite, such as a CubeSat. The artificial satellite applied to the mobile node 20 may be on any orbit, such as a low earth orbit (LEO), a medium earth orbit (MEO), a geostationary earth orbit (GEO), a transfer orbit, the proximity of the moon, and deep space. It is not necessary to launch all artificial satellites at the same time, and the system may be expanded or reduced halfway. Each of the mobile nodes 20 performs what is called a formation flight of flying in formation with other mobile nodes 20 constituting the same mobile node group 2 together.

It is not required that the mobile nodes 20 constituting the mobile node group 2 are all artificial satellites for the achievement of the formation flight, and any one or more or all of them may be configured by a flying object (an aircraft, a drone, a High-Altitude Platform Station (HAPS), an Unmanned Aerial Vehicle (UAV), and the like), a ship, a UAV, a USV, or the like that moves on the sea, under the sea, on the water, or under the water, a vehicle, such as an automobile and a train, traveling on the ground, and further communication devices implemented in these mobile nodes 20.

In the overall configuration of the mobile node group control system 1 illustrated in FIG. 1, while wireless communication is performed mainly by the individual mobile nodes 20 constituting the mobile node group 2, the mobile node group control system 1 can be further classified into the following configurations corresponding to the purposes and the application.

Figure 2:
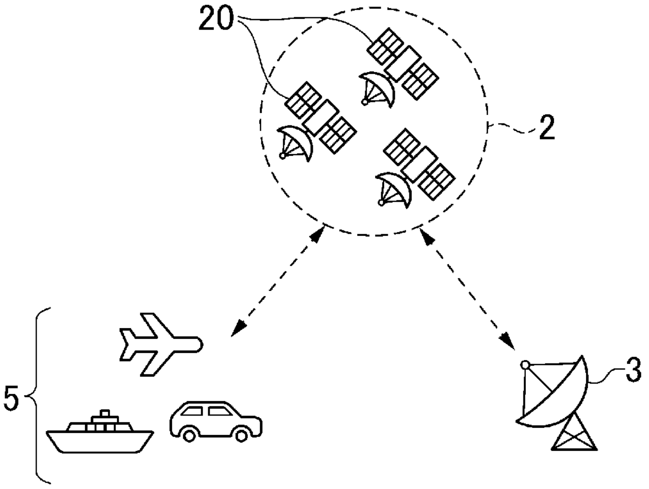
FIG. 2 is a diagram illustrating a configuration in which data is relayed between a user on the ground and a ground station installed similarly on the ground via individual mobile nodes constituting a mobile node group.
Figure 3:
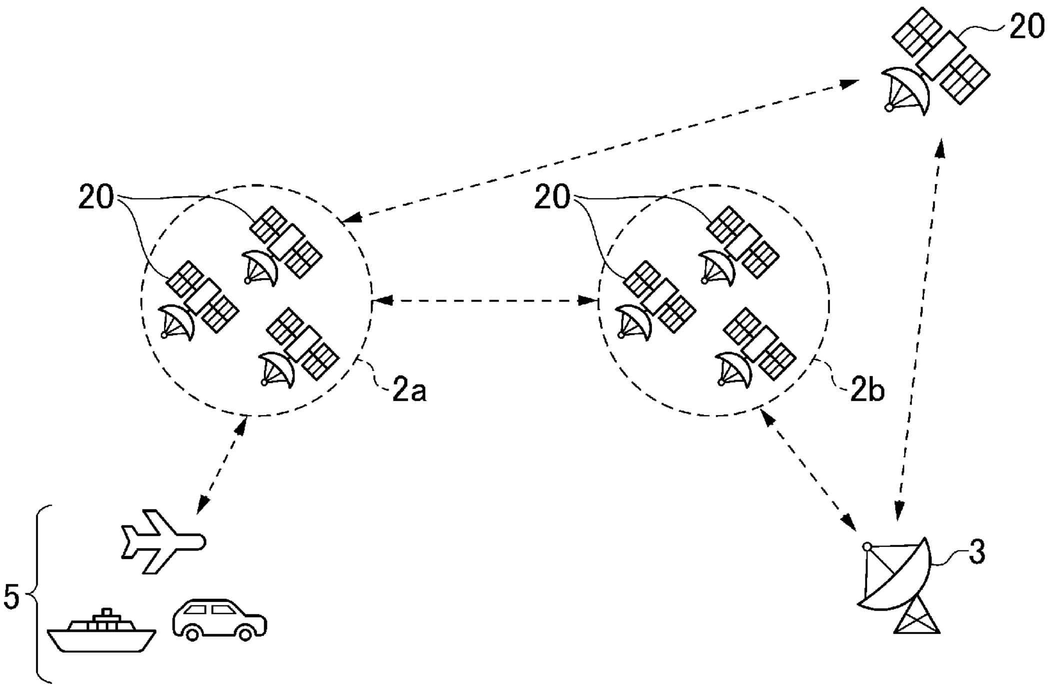
FIG. 3 is a diagram illustrating an example of relaying data transmitted and received between the user and the ground station via individual mobile nodes of a plurality of mobile node groups.

FIG. 2 and FIG. 3 illustrate configurations of relaying data between the user 5 on the ground and the ground station 3 installed on the ground as well via the individual mobile nodes 20 constituting the mobile node group 2. The user 5 here collectively means all communication devices, for example, communication instruments installed in an airplane, a ship, a vehicle, and an architectural construction on the ground, or an individual mobile terminal, a smartphone, a tablet terminal, a wearable device, and the like. The configuration of FIG. 2 is an example of relaying data transmitted and received between the user 5 and the ground station 3 via the individual mobile nodes 20 constituting one mobile node group 2. The configuration of FIG. 3 is an example of relaying data transmitted and received between the user 5 and the ground station 3 via the individual mobile nodes 20 of a plurality of the mobile node groups 2 including a mobile node group 2*a* and a mobile node group 2*b*. At this time, the data may be relayed via the single mobile node 20 not belonging to any mobile node group 2 instead of the mobile node group 2*b*.

Figure 4:
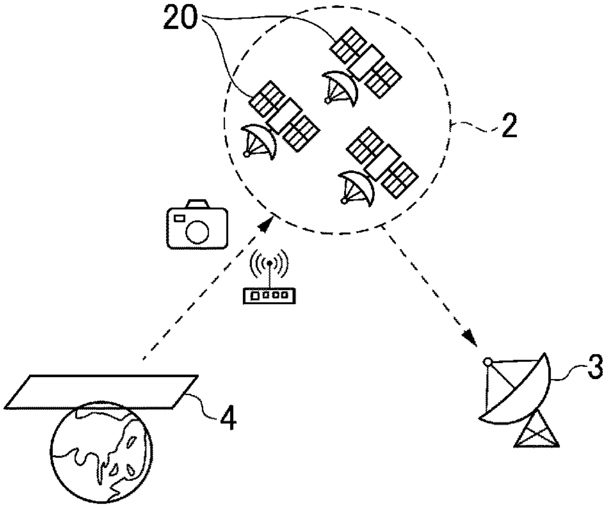
FIG. 4 is a diagram illustrating an example of relaying data transmitted from an earth observation remote sensing system to the ground station via individual mobile nodes constituting one mobile node group.
Figure 5:
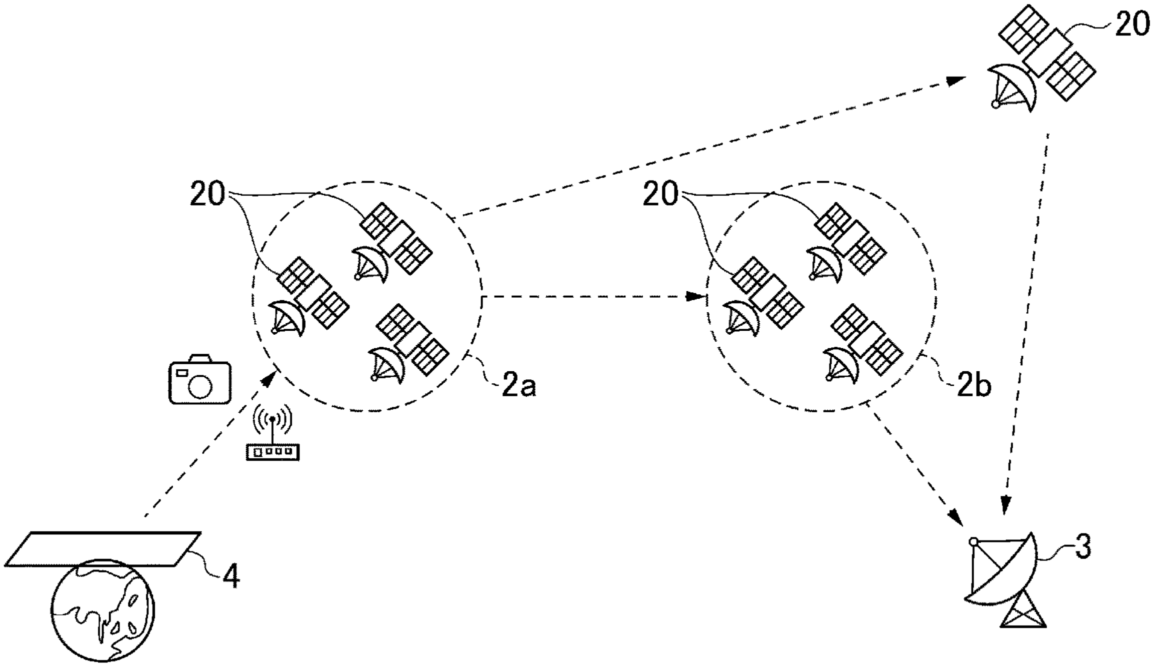
FIG. 5 is a diagram illustrating an example of relaying data transmitted from the earth observation remote sensing system to the ground station via the individual mobile nodes of the plurality of mobile node groups.

FIG. 4 and FIG. 5 illustrate configurations of relaying data between the earth observation remote sensing system 4 and the ground station 3 installed on the ground via the individual mobile nodes 20 constituting the mobile node group 2. The earth observation remote sensing system 4 here is a sensing system for observing all phenomena on earth, such as weather information, resource exploration, geological exploration, a land use survey, various ocean and environmental observations, forest condition, and growth status of crops. The configuration of FIG. 4 is an example of relaying data transmitted from the earth observation remote sensing system 4 to the ground station 3 via the individual mobile nodes 20 constituting one mobile node group 2. The configuration of FIG. 5 is an example of relaying data transmitted from the earth observation remote sensing system 4 to the ground station 3 via the individual mobile nodes 20 of a plurality of the mobile node groups 2 including the mobile node group 2*a* and the mobile node group 2*b*. At this time, the data may be relayed via the single mobile node 20 not belonging to any mobile node group 2 instead of the mobile node group 2*b*.

Figure 6:
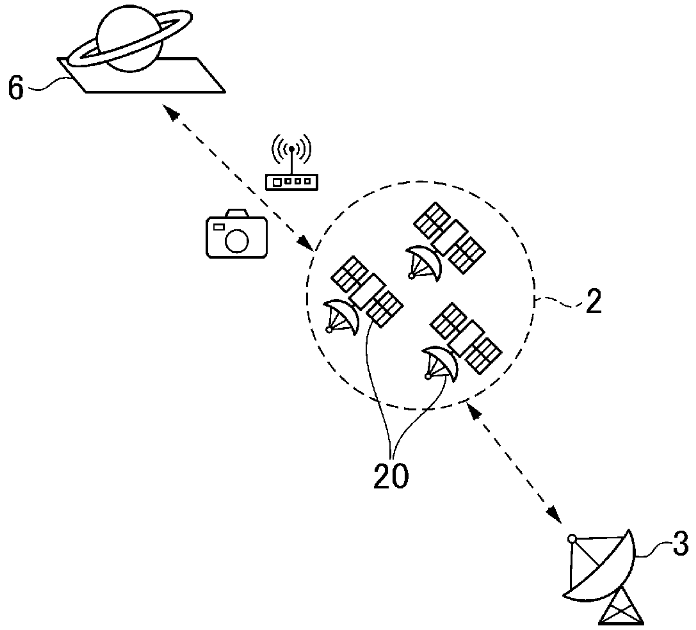
FIG. 6 is a diagram illustrating an example of relaying data transmitted and received between a deep space observation gravitational wave measurement system and the ground station via the individual mobile nodes constituting one mobile node group.

FIG. 6 illustrates a configuration of relaying data between the deep space observation gravitational wave measurement system 6 and the ground station 3 installed on the ground via the individual mobile nodes 20 constituting the mobile node group 2. The deep space observation gravitational wave measurement system 6 here is a system for space observation using a gravitational wave. The configuration of FIG. 6 is an example of relaying data transmitted and received between the deep space observation gravitational wave measurement system 6 and the ground station 3 via the individual mobile nodes 20 constituting one mobile node group 2. At this time, the data may be relayed via the single mobile node 20 not belonging to any mobile node group 2 instead of the mobile node group 2.

Figure 7:
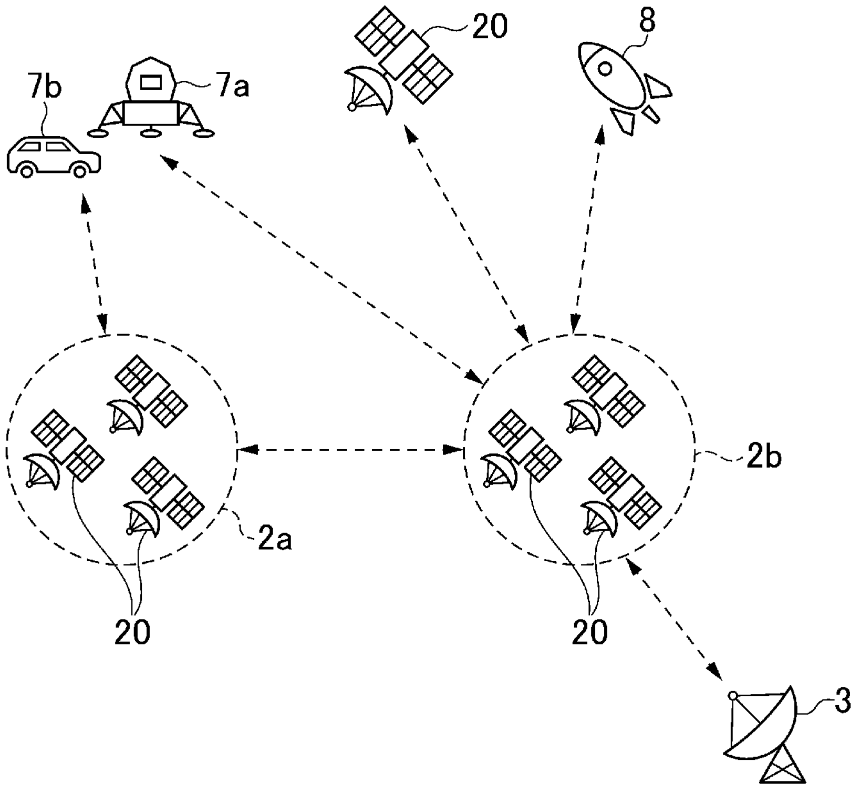
FIG. 7 is a diagram illustrating a configuration in which data is relayed between a lander, a rover, and a spaceplane and the ground station installed on the ground via the individual mobile nodes constituting the mobile node groups.

FIG. 7 illustrates a configuration of relaying data between the lander 7*a*, the rover 7*b*, and the spaceplane 8 and the ground station 3 installed on the ground via the individual mobile nodes 20 constituting the mobile node groups 2. Incidentally, the lander 7*a* includes all landers that can be landed on a surface of an astronomical object. The rover 7*b* is a vehicle that moves on a surface of an astronomical object to perform observation, but is not limited thereto, and includes all transportation means that can move on a surface of an astronomical object. Furthermore, data may be relayed with an unmovable fixed base station installed on a surface of an astronomical object via the mobile node 20 instead of the lander 7*a* or the rover 7*b*. Data transmitted and received between the lander 7*a*, the rover 7*b*, and the spaceplane 8 and the ground station 3 is relayed via the individual mobile nodes 20 constituting one mobile node group 2*b*. At this time, the data may be relayed from the mobile node group 2*b* via another mobile node group 2*a*, or via the single mobile node 20 not belonging to any mobile node group 2.

Figure 8:
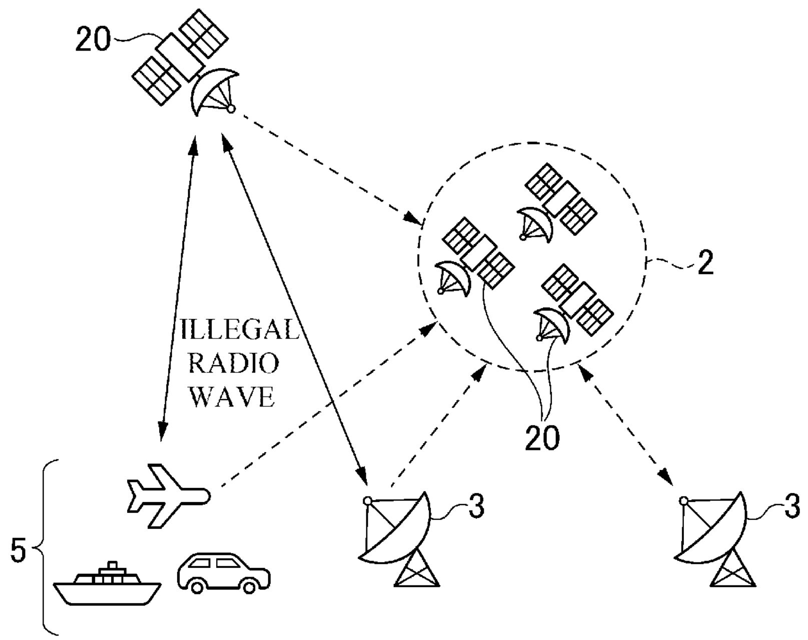
FIG. 8 is a diagram illustrating an example of monitoring radio waves of the ground station and the user on the ground via the mobile nodes.

FIG. 8 illustrates an example of monitoring radio waves of the ground station 3 and the user 5 on the ground via the mobile nodes 20. One ground station 3 and the user 5 on the ground communicate with another ground station 3, usually as illustrated in FIG. 2 and FIG. 3, via the mobile nodes 20 included in the mobile node group 2. At this time, assume that the mobile node 20 detects an illegal radio wave from the ground station 3 or the user 5 on the ground. At this time, the mobile node 20 that has detected the illegal radio wave transmits the fact to the other ground stations 3 via the mobile nodes 20 included in the other mobile node group 2 or directly.

Figure 9:
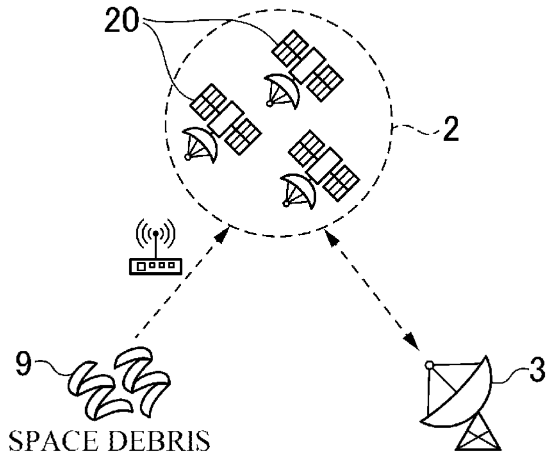
FIG. 9 is a diagram illustrating an example of monitoring space debris.

FIG. 9 illustrates an example of monitoring space debris. When the space debris 9 is detected through the mobile node 20, the fact is transmitted to the ground station 3 via the individual mobile nodes 20 of the mobile node group 2. At this time, the fact may be relayed via further another mobile node group 2 or the single mobile node 20 not belonging to the mobile node group 2.

Next, configurations of the mobile node 20 applied in respective configurations of the mobile node group control system 1 will be described. While the following describes a case where the mobile node 20 is an artificial satellite as an example, it is obvious that when the mobile node 20 is applied to a mobile node other than the artificial satellite, various configurations corresponding to the application target are further implemented.

Figure 10:
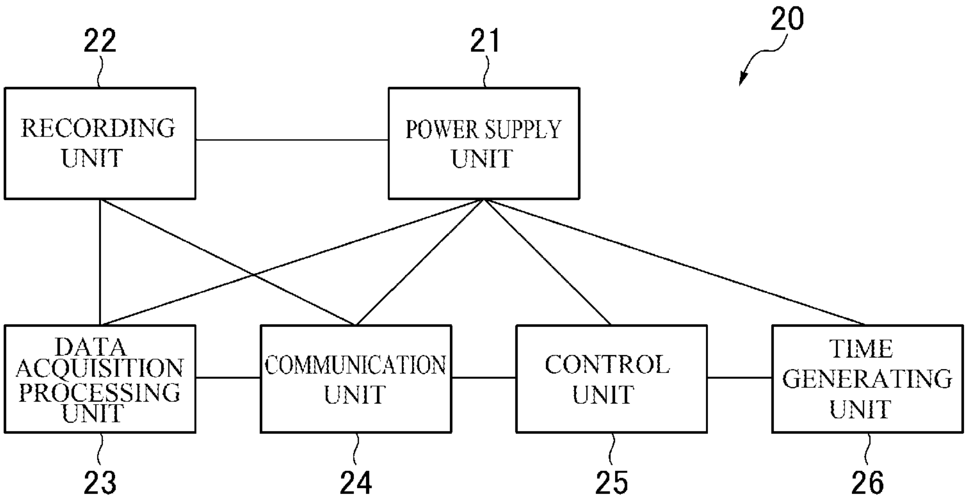
FIG. 10 is a diagram illustrating an example of a common configuration implemented in the mobile node.

FIG. 10 illustrates an example of a common configuration implemented in any mobile node 20. The mobile node 20 includes a power supply unit 21, and a recording unit 22, a data acquisition processing unit 23, a communication unit 24, a control unit 25, and a time generating unit 26, which are each connected to the power supply unit 21. The recording unit 22 is connected to the data acquisition processing unit 23 and the communication unit 24, the communication unit 24 is connected to the control unit 25, and the control unit 25 is connected to the time generating unit 26. All of the components illustrated in the mobile node 20 are not necessarily required, and the respective configurations may be omitted as necessary.

The power supply unit 21 stores electric power necessary for operating the mobile node 20 itself, and is configured by, for example, a power supply module or a battery specialized for satellites. The power supply unit 21 may employ a system of generating power from solar light as necessary. The power supply unit 21 supplies an electric source stored by itself to the recording unit 22, the data acquisition processing unit 23, the communication unit 24, the control unit 25, and the time generating unit 26 connected to the power supply unit 21.

The recording unit 22 is configured by a server and a storage device that store various kinds of information. While it is obvious that the recording unit 22 stores various kinds of information necessary for wireless communication, in addition to them, the recording unit 22 records data corresponding to various kinds of services to be provided and usage in advance. The recording unit 22 also records various kinds of data acquired and processed by the data acquisition processing unit 23.

The data acquisition processing unit 23 acquires additional data acquired in the flying process of the mobile node 20, performs various kinds of processes on the additional data, and transmits the additional data to the recording unit 22.

The communication unit 24 includes an antenna for wireless communication with the ground station 3, the earth observation remote sensing system 4, the user 5, the deep space observation gravitational wave measurement system 6, the lander 7*a* and the rover 7*b* that explore the moon and planets, the spaceplane 8, and the like under the control by the control unit 25, and a circuit unit that performs amplification, frequency conversion, modulation, and the like necessary for the communication. Details of the communication unit 24 will be described later.

The control unit 25 serves as a central control unit to control the entire mobile node 20.

The time generating unit 26 is a unit that generates exact time in the mobile node 20.

Figure 11:
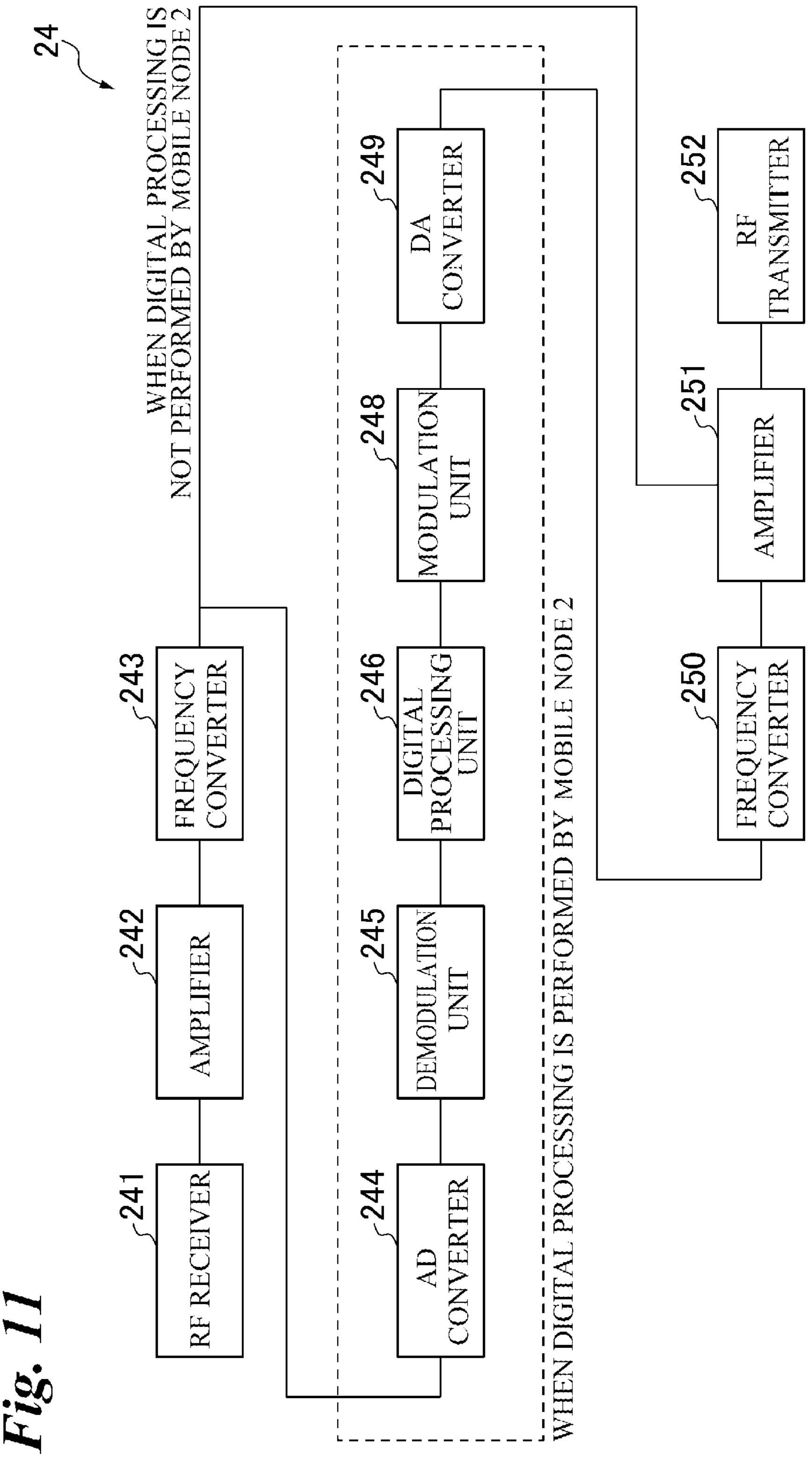
FIG. 11 is a diagram illustrating a block configuration of a communication unit used in the configurations of FIGS. 2, 3, 7, and 8 in detail.

FIG. 11 illustrates a detailed block configuration of the communication unit 24 used in the configurations of FIGS. 2, 3, 7, and 8. The communication unit 24 includes an RF receiver 241, an amplifier 242 connected to the RF receiver 241, a frequency converter 243 connected to the amplifier 242, an AD converter 244 and an amplifier 251 connected to the frequency converter 243, a demodulation unit 245 connected to the AD converter 244, a digital processing unit 246 connected to the demodulation unit 245, a modulation unit 248 connected to the digital processing unit 246, a DA converter 249 connected to the modulation unit 248, a frequency converter 250 connected to the DA converter 249 and the amplifier 251, and an RF transmitter 252 connected to the amplifier 251.

To achieve the configurations of FIGS. 2, 3, 7, and 8, the communication unit 24 functions to receive data from the user 5, another mobile node 20, the ground station 3, and the like, and relay the data toward other users 5, other mobile nodes 20, and the ground stations 3. Therefore, what is called a relay process of transmitting the data received by the RF receiver 241 toward the RF transmitter 252 is performed. When digital processing is not performed in the mobile node 20 side, the configuration including the AD converter 244, the demodulation unit 245, the digital processing unit 246, the modulation unit 248, and the DA converter 249 may be omitted.

The RF receiver 241 includes, for example, an antenna that receives a data signal received from the outside. The amplifier 242 includes an amplifier circuit that amplifies the data signal received by the RF receiver 241. The frequency converter 243 performs frequency conversion by superimposing the data signal amplified by the amplifier 242 on a signal having a desired intermediate frequency. While the process proceeds to an amplifying process by the amplifier 251 when the digital processing is not performed in the mobile node 20 side, the AD converter 244 performs AD conversion when the digital processing is performed in the mobile node 20 side. The demodulation unit 245 performs a demodulation process on the data signal on which the AD conversion has been performed. The digital processing unit 246 performs required digital processing on the data signal on which the demodulation process has been performed. At this time, outside the communication unit 24, under the control by the control unit 25, the data acquisition processing unit 23 may acquire data, perform required processing, and further superimpose required information. The modulation unit 248 performs modulation on the data signal on which the digital processing has been performed. The DA converter performs DA conversion on the data signal that has been modulated, and transmits it to the frequency converter 250. The frequency converter 250 converts the band of the data signal that has been converted into an intermediate frequency into the original band. The amplifier

251 amplifies the data signal to be input. The RF receiver 241 includes, for example, an antenna that transmits the data signal amplified by the amplifier 251 to the outside.

Figure 12:
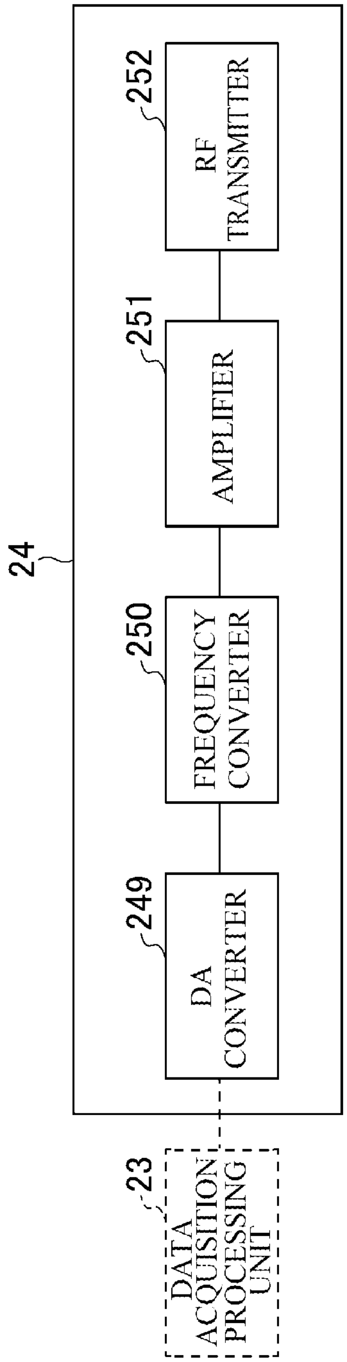
FIG. 12 is a diagram illustrating a block configuration of a communication unit used in the configurations of FIGS. 4, 6, and 9 in detail.

FIG. 12 illustrates a detailed block configuration of the communication unit 24 used in the configurations of FIGS. 4, 6, and 9. In the configurations of FIGS. 4, 6, and 9, the data acquisition processing unit 23 acquires observation and measurement data by the earth observation remote sensing system 4 and the deep space observation gravitational wave measurement system 6 and data from the space debris 9, performs desired processing thereon, and then transmits them to the ground station 3 and the like via the communication unit 24. The communication unit 24 used in the case includes the DA converter 249 connected to the data acquisition processing unit 23, the frequency converter 250 connected to the DA converter 249 and the amplifier 251, and the RF transmitter 252 connected to the amplifier 251. For components and members the same as those in the above-described configuration, the same reference numerals are attached, and the explanations will be omitted in the following description.

The DA converter 249 performs a DA conversion process on the data signal acquired by the data acquisition processing unit 23, and outputs it to the frequency converter 250.

Figure 13:
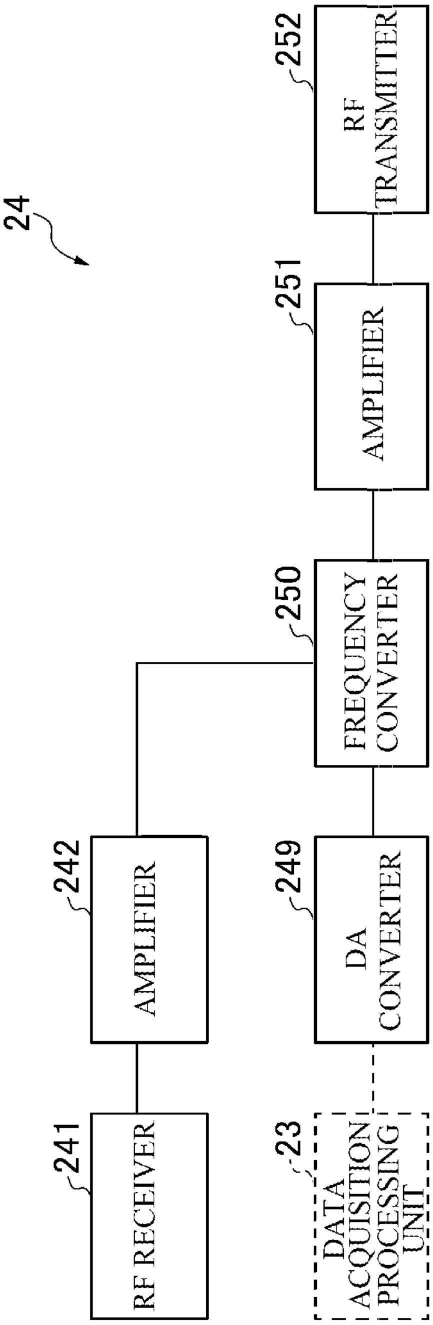
FIG. 13 is a diagram illustrating a block configuration of a communication unit used in the configuration of FIG. 5 in detail.

FIG. 13 illustrates a detailed block configuration of the communication unit 24 used in the configuration of FIG. 5. The configuration of FIG. 5 includes, in addition to the case where the data acquisition processing unit 23 acquires the observation and measurement data by the earth observation remote sensing system 4, a case where data acquired from the earth observation remote sensing system 4 by another mobile node group 2*a* is relayed. The communication unit 24 used in the case includes the DA converter 249 connected to the data acquisition processing unit 23, the frequency converter 250 connected to the DA converter 249 and the amplifier 251, and the RF transmitter 252 connected to the amplifier 251, and includes the RF receiver 241 and the amplifier 242 connected to the RF receiver 241 and the frequency converter 250. For components and members the same as those in the above-described configuration, the same reference numerals are attached, and the explanations will be omitted in the following description.

The RF receiver 241 receives the data signal acquired from the earth observation remote sensing system 4 by the other mobile node group 2*a*. The amplifier 242 amplifies the data signal received by the RF receiver 241, and outputs it to the frequency converter 250.

Figure 14:
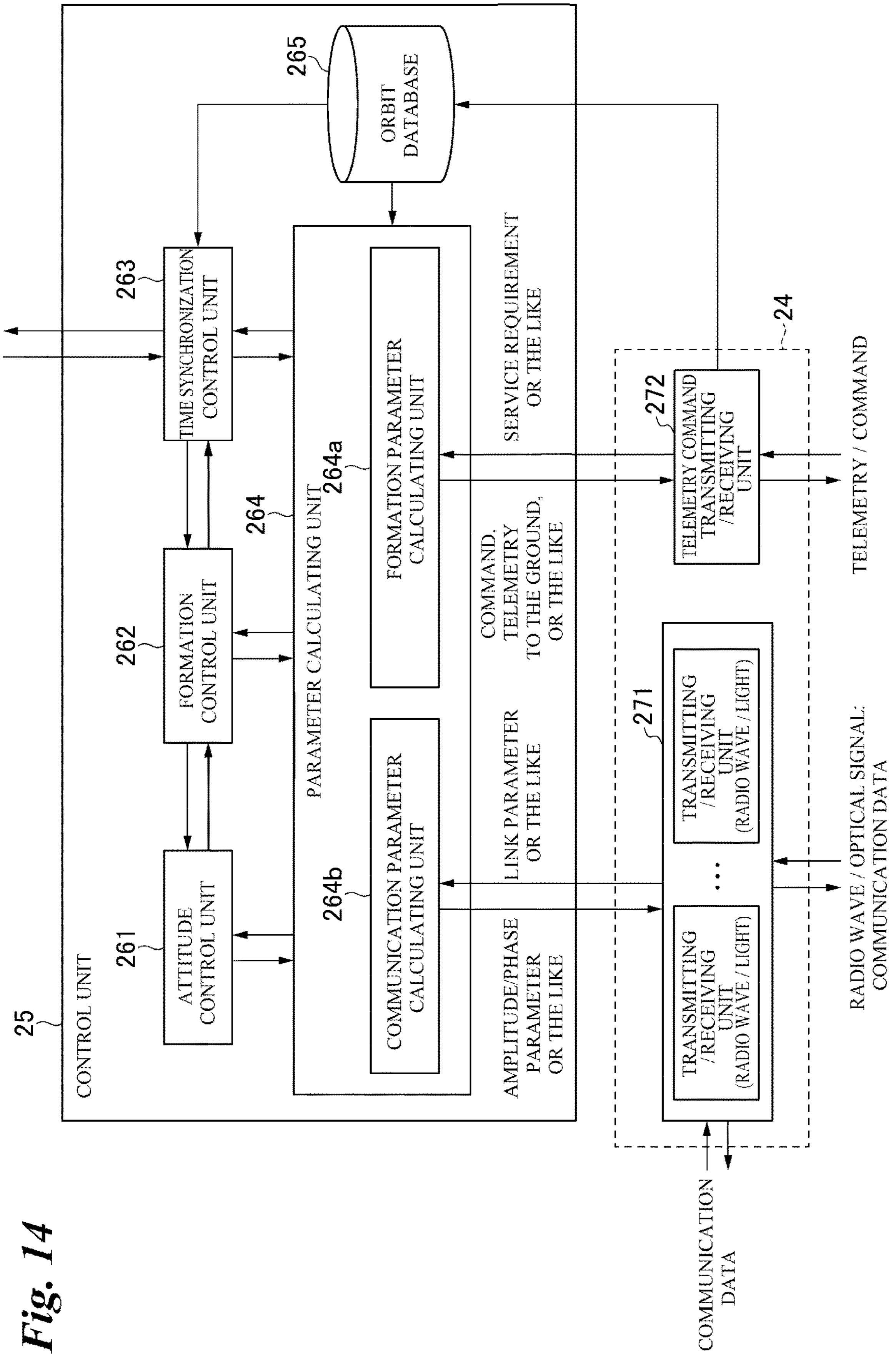
FIG. 14 is a diagram illustrating a block configuration of a control unit included in the mobile node in detail.

FIG. 14 illustrates a detailed block configuration of the control unit 25 included in the mobile node 20. The control unit 25 includes an attitude control unit 261, a formation control unit 262, a time synchronization control unit 263, and an orbit database 265, which are each connected to a parameter calculating unit 264, and the parameter calculating unit 264 includes a formation parameter calculating unit 264*a* and a communication parameter calculating unit 264*b*. The control unit 25 is installed in the mobile node 20 as an on-board processor in which these components are all implemented.

The communication unit 24 connected to the control unit 25 includes a transmitting/receiving unit 271 and a telemetry command transmitting/receiving unit 272.

The attitude control unit 261 executes attitude control when the mobile node 20 flies. The formation control unit 262 is linked with the other mobile nodes 20, and performs various kinds of control to performs what is called a formation flight of flying in formation with one another. The attitude control unit 261 and the formation control unit 262 perform what is called control execution of actually generating signals of control instructions and transmitting them. Parameters necessary for these controls by the attitude control unit 261 and the formation control unit 262 are transmitted from the parameter calculating unit 264.

The time synchronization control unit 263 performs control of time synchronization and time compensation necessary for performing the formation flight by the formation control unit 262. The time synchronization control unit 263 is linked with the time generating unit 26, and transmits and receives time information with the time generating unit 26 as necessary.

The formation parameter calculating unit 264*a* in the parameter calculating unit 264 receives a service requirement from the telemetry command transmitting/receiving unit 272. The formation parameter calculating unit 264*a* calculates a formation parameter, such as a configuration of the mobile node group 2 (a cluster) and a relation between the leader and the follower, corresponding to the received service requirement and orbit data of the mobile node group 2 to which the mobile node 20 belongs. Incidentally, in a case of a leader mobile node 20*a*, a command to a follower mobile node 20*b* and a telemetry command to the ground station 3 are generated, and they are transmitted to the telemetry command transmitting/receiving unit 272. The formation parameter calculating unit 264*a* calculates a communication parameter necessary for the communication by beamforming, MIMO, or the like based on information received from the telemetry command transmitting/receiving unit 272. The formation parameter calculating unit 264*a* communicates with the formation control unit 262, the attitude control unit 261, and the time synchronization control unit 263 corresponding to the calculation result, thereby performing the time synchronization and the formation configuration.

The communication parameter calculating unit 264*b* in the parameter calculating unit 264 calculates optimal parameters of the amplitude and the phase necessary for performing beamforming, MIMO, or the like based on a link parameter received from the communication unit 24, and transmits the optimal parameters to the communication unit 24.

The orbit database 265 stores orbit data necessary for the calculation of the various parameters by the formation parameter calculating unit 264*a*.

Note that the present invention may be embodied as an independent communication device including the communication unit 24 and the control unit 25 illustrated in FIG. 14.

Figure 15:
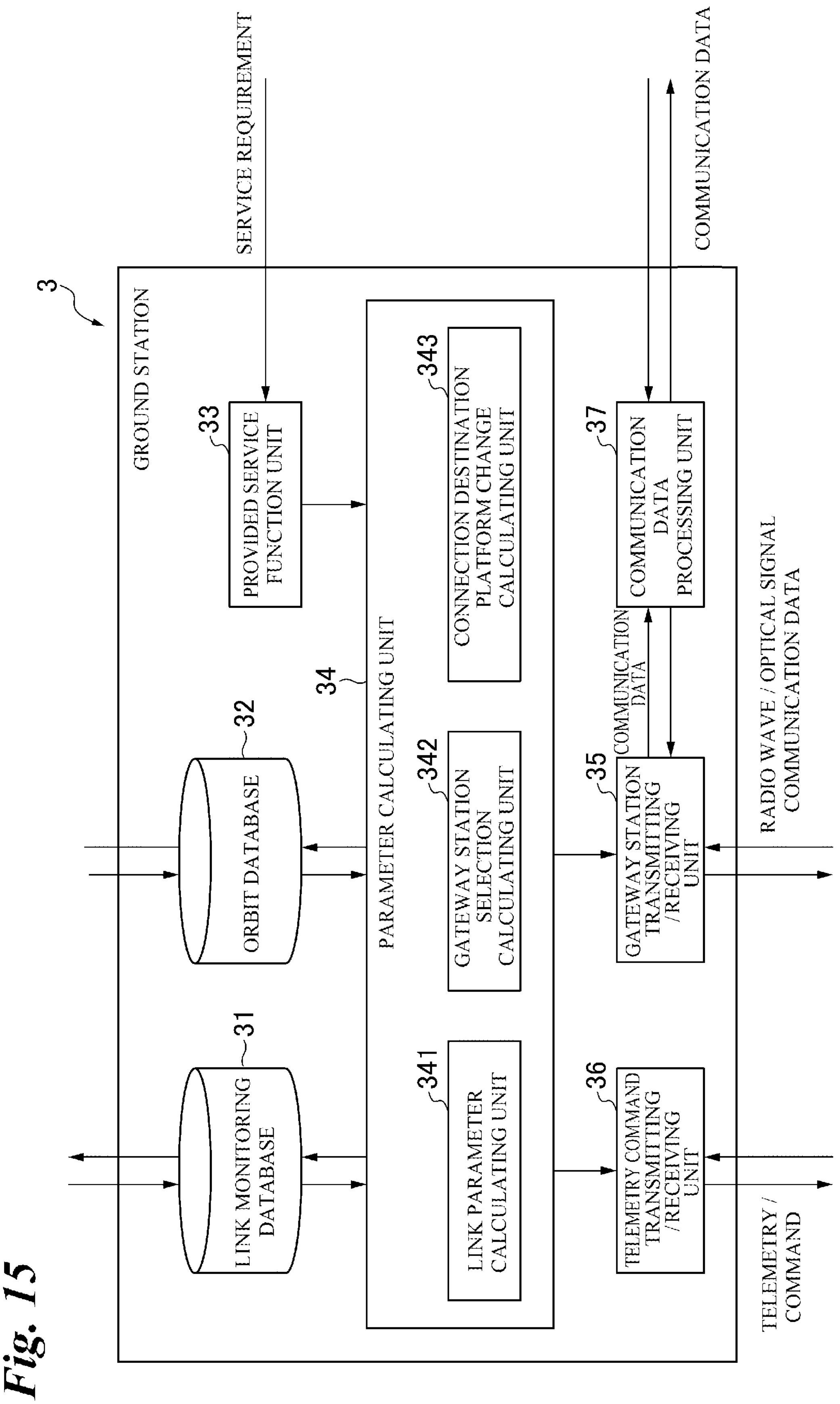
FIG. 15 is a diagram illustrating an exemplary block configuration of a control system implemented in the ground station.

FIG. 15 illustrates an exemplary block configuration of a control system implemented in the ground station 3. The ground station 3 includes a link monitoring database 31, an orbit database 32, a provided service function unit 33, a telemetry command transmitting/receiving unit 36, and a gateway station transmitting/receiving unit 35, which are each connected to a parameter calculating unit 34, and the gateway station transmitting/receiving unit 35 is connected to a communication data processing unit 37. The parameter calculating unit 34 includes a link parameter calculating unit 341, a gateway station selection calculating unit 342, and a connection destination platform change calculating unit 343.

The link monitoring database 31 is a database that stores link monitoring information acquired by the gateway station transmitting/receiving unit 35 and the telemetry command transmitting/receiving unit 36. The link monitoring information includes received power, received C/NO (density ratio of carrier power to noise power), a center frequency, a bandwidth, throughput, a bit error rate (BER), a packet loss rate, rainfall attenuation, and the like.

The orbit database 32 stores orbit data necessary for the calculation of various parameters by the parameter calculating unit 34.

The link monitoring database 31 and the orbit database 32 are connected to a cloud server, used in common by all the ground stations, and used for optimizing the parameters.

The provided service function unit 33 identifies a function necessary in the mobile node group control system 1 corresponding to the service requirement from the user.

The link parameter calculating unit 341 calculates optimal parameters of the amplitude and the phase necessary for performing beamforming, MIMO, or the like, and link parameters, such as a carrier frequency, a bandwidth, output power, a modulation scheme, a type and a code rate of an error correcting code, a multiplexing scheme, and the number of carriers.

The gateway station selection calculating unit 342 determines a gateway station through which each of the mobile nodes 20 in the mobile node group 2 communicates.

The connection destination platform change calculating unit 343 determines a platform in which each of the mobile nodes 20 in the mobile node group 2 communicates.

The information acquired by the respective components of the parameter calculating unit 34 is transmitted to each of the mobile node groups 2 by the command via the telemetry command transmitting/receiving unit 36.

The gateway station transmitting/receiving unit 35 has a function of compensating an amount of the Doppler shift with the mobile node group 2. Communication data of a radio wave or an optical signal to be transmitted from various places on the ground via the mobile node group 2 is transmitted to the mobile node group 2 via the communication data processing unit 37 and the gateway station transmitting/receiving unit 35. Communication data received from the mobile node group 2 is transmitted to various places on the ground via the gateway station transmitting/receiving unit 35 and the communication data processing unit 37.

Note that the present invention may be embodied as an independent communication device including the components constituting the ground station 3 illustrated in FIG. 15.

Figure 16:
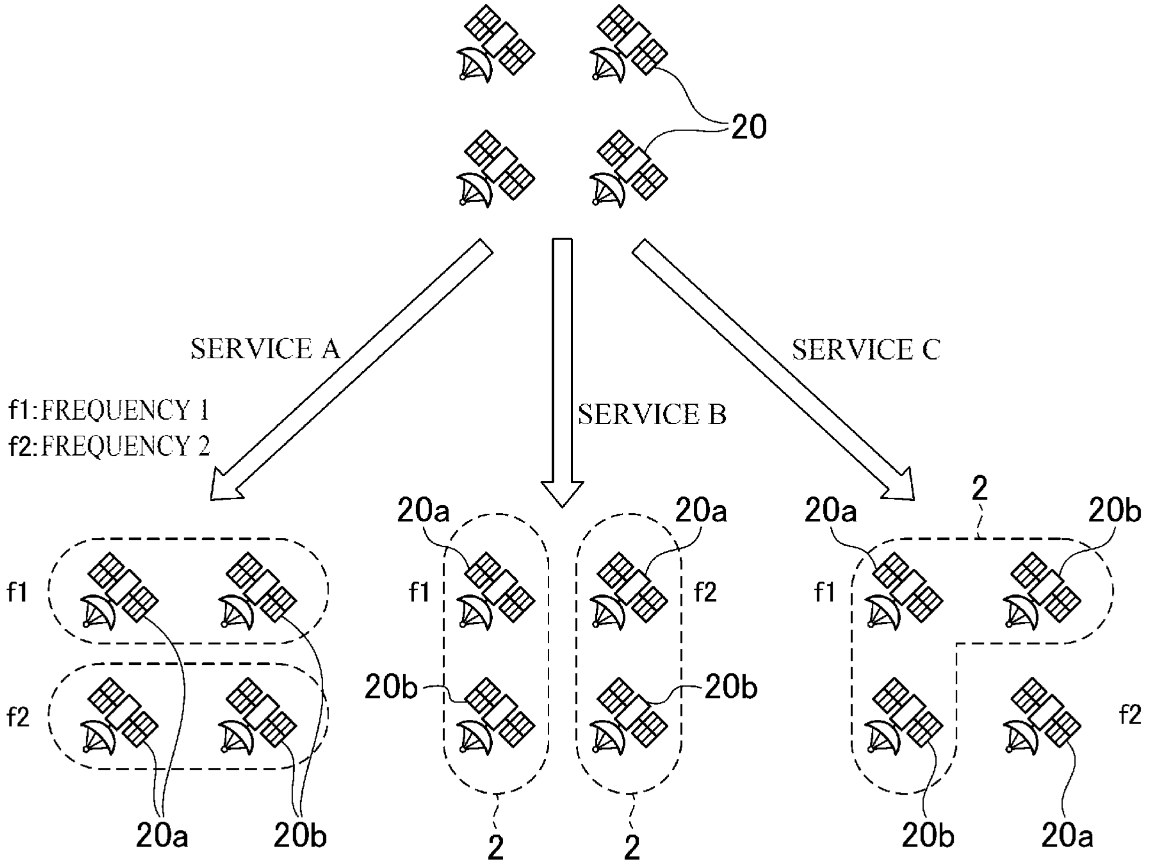
FIG. 16 is a diagram illustrating an example of dividing the mobile nodes into N mobile node groups (clusters), each including any number of the mobile nodes, corresponding to services and users.

The mobile node group control system 1 to which the present invention is applied may be divided into N mobile node groups 2 (clusters), each including any number (one or a plurality) of the mobile nodes, corresponding to the service and the user as illustrated in FIG. 16. In each of the mobile node groups 2, the leader mobile node 20*a* to be served as a leader is assigned to at least one mobile node 20, and the other mobile nodes 20 are assigned the follower mobile nodes 20*b*. The leader mobile node 20*a* collects information on the follower mobile nodes 20*b*, determines parameters and the like of formation and beamforming, and transmits a command to each of the follower mobile nodes 20*b*. This allows the leader mobile node 20*a* to control the follower mobile nodes 20*b*. That is, the leader mobile node 20*a* may control the relative positions and the attitudes of the respective follower mobile nodes 20*b* by aggregating the states, such as relative positions, attitudes, and time, of the respective follower mobile nodes 20*b* and transmitting the command to the follower mobile nodes 20*b*. The respective mobile node groups 2 may use mutually different communication frequencies. Beamforming or MIMO may be used for each of the mobile node groups 2.

The leader mobile node 20*a* can be changed corresponding to the situation. When the performance is uniform between the mobile nodes 20, any mobile node 20 may be assigned the leader mobile node 20*a*, and when the performance is not uniform between the mobile nodes 20, the mobile node 20 having the highest performance may be assigned the leader mobile node 20*a*. The mobile node 20 located at any position forming the formation flight may be assigned the leader mobile node 20*a*.

Figure 17A:
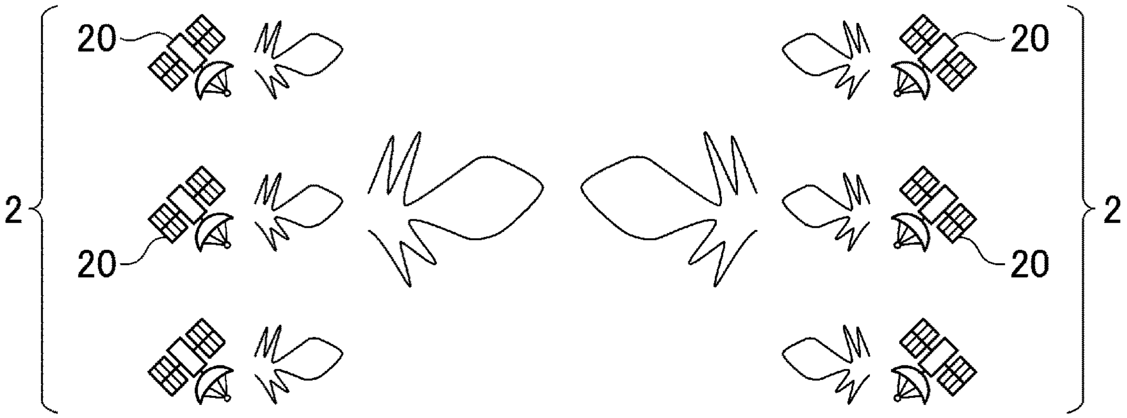
FIGS. 17A and 17B are diagrams illustrating examples of beamforming and MIMO.
Figure 17B:
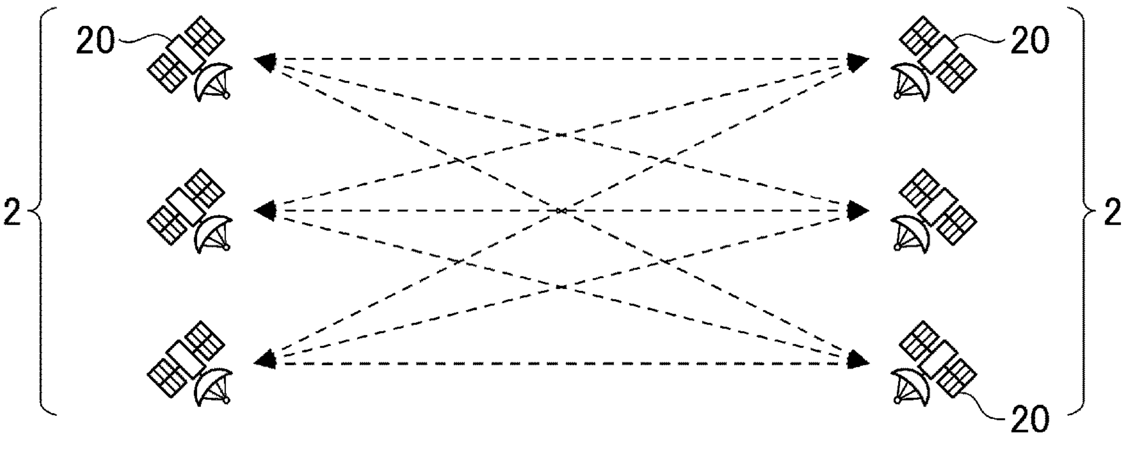

FIGS. 17A and 17B illustrate examples of beamforming and MIMO. In the beamforming, as illustrated in FIG. 17A, in each of the mobile node group 2 including the N mobile nodes 20 and the mobile node group 2 including the M mobile nodes 20, each of the satellites controls the phase of the radio wave to perform the beamforming, thereby increasing the whole capacity of a communication channel to the maximum. At this time, at least one mobile node 20 constituting the mobile node group 2 may have a beamforming function. In the MIMO, as illustrated in FIG. 17B, between the mobile node group 2 including the N mobile nodes 20 and the mobile node group 2 including the M mobile nodes 20, the whole capacity of the communication channel is increased to the maximum in a matrix channel including N×M transmission channels.

The form of the formation flight performed by the mobile node group 2 including the leader mobile node 20*a* and the follower mobile nodes 20*b* may be any form. The formation is changed corresponding to the user 5 and the service to be used, and multiple sharp beams, a small number of broad beams, or the like are formed by the beamforming. The number of beams may be appropriately set, and can be changed corresponding to the user 5 and the service to be used.

The mobile node group control system 1 may transmit the time generated by the respective mobile nodes 20 together at the data transmission. The time is generated by the above-described time generating unit 26. The time generating unit 26 may include an atomic clock, an optical lattice clock, or the like to generate the time with high accuracy. Accordingly, when the communication network or the data transmission is interrupted, and data is re-transmitted, the re-transmission can be efficiently performed based on the transmitted time information.

In the mobile node group control system 1 to which the present invention is applied, the position and the speed of the mobile node group 2 may be estimated from delay and Doppler that can be detected between the mobile node group 2 and the ground station 3 and between the mobile node group 2 and the mobile node group 2, and the position of the mobile node 20 and the error of the beamforming may be corrected from the estimation values. A position error of the mobile node group 2 may be detected from distortion of a received beam pattern of the ground station 3, and the position and the beamforming parameters (the amplitude and the phase) of the mobile node 20 may be corrected.

A radio wave may be used between the mobile node group 2 and the ground station 3, between the mobile node group 2 and the mobile node group 2, between the mobile node group 2 and the deep space observation gravitational wave measurement system 6, and between the mobile node group 2 and the single mobile node 20, and a radio wave or a light may be used for the communication between the mobile nodes 20 in the mobile node group 2. Each of the mobile nodes 20 may include a standardized interface.

Next, the operation of the mobile node group control system 1 to which the present invention is applied will be described.

Figure 18:
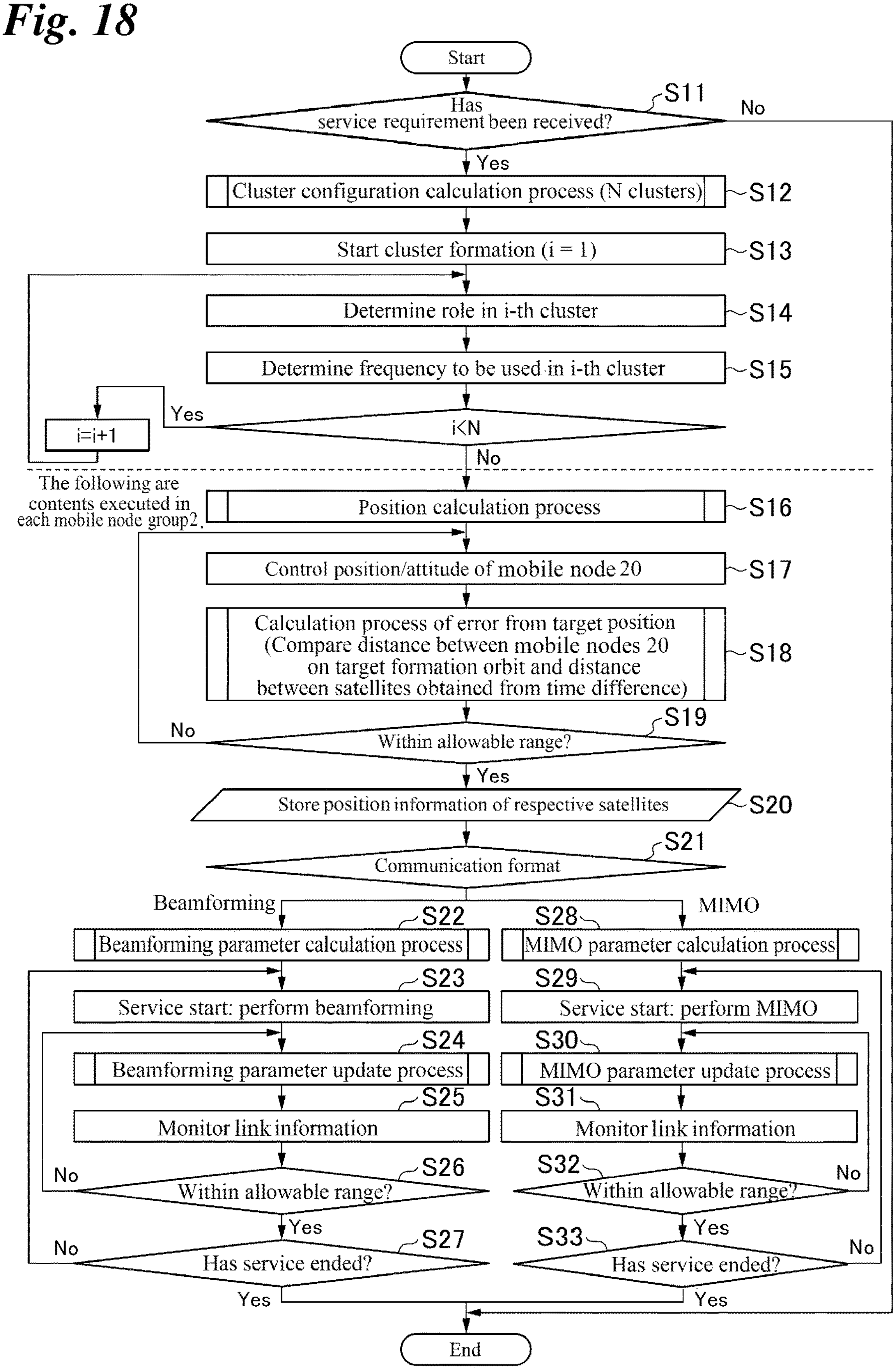
FIG. 18 is a flowchart illustrating a control flow in the mobile node group.

FIG. 18 illustrates a control flow in the mobile node group 2. In Step S11, whether or not a service requirement has been received is determined. The service requirement here is a requirement, for example, required in the service provided by the mobile node group 2 (for example, weather observation, environment observation, a soil survey, a land use survey, and a forest survey). When the service requirement is received, the process proceeds to Step S12. On the other hand, when the service requirement fails to be received, the processing operation ends for the time being.

In Step S12, a cluster configuration calculation process is performed. When the cluster is the above-described mobile node group 2, the number of the mobile node groups 2 is detected. Here, the number of the mobile node groups 2 as the clusters is assumed as N.

Next, the process proceeds to Step S13, and cluster formation is started. The cluster formation is repeatedly performed until i becomes N with i=1 assumed. As a result, i=1 to N are assigned to the respective mobile node groups 2 as the clusters.

Next, when the process proceeds to Step S14, the leader mobile node 20*a* and the follower mobile node 20*b* are assigned in each of the i-th clusters (mobile node groups 2).

Next, the process proceeds to Step S15, and the frequency to be used is determined for each of the i-th clusters (mobile node groups 2). The operations of Steps S14 to S15 are repeatedly performed for each of the clusters (mobile node groups 2) until i reaches N. Then, after the leader mobile node 20*a* and the follower mobile node 20*b* are assigned and the frequency to be used is determined in every mobile node group 2, the process proceeds to Step S16.

Step S16 and the following steps are operations performed in each of the mobile node groups 2. In Step S16, a position calculation process is performed for each of the mobile nodes 20. In this case, the time information is transmitted and received between the leader mobile node 20*a* and the follower mobile node 20*b*. At this time, the leader mobile node 20*a* collects the time information from the respective follower mobile nodes 20*b*, thereby calculating the position information of the respective follower mobile nodes 20*b*.

Next, the process proceeds to Step S17, and the position and the attitude of the mobile node 20 are controlled. In this case, each of the mobile nodes 20 performs the position control and the attitude control by itself with the attitude control unit 261 and the formation control unit 262 of the installed on-board processor. At this time, each of the follower mobile nodes 20*b* may receive information necessary for the control from the leader mobile node 20*a*, and may perform the position control and the attitude control by itself based on the information. This allows achieving the formation flight in which the leader mobile node 20*a* is centered and followed by the follower mobile nodes 20*b*.

Next, the process proceeds to Step S18, and a calculation process of an error from a target position is performed. In Step S18, for performing a desired formation flight, an error between an actual distance between the mobile nodes 20 and position information, and an actual target position calculated from the time information is calculated.

Next, the process proceeds to Step S19, and whether or not the error calculated in Step S18 is within an allowable range is determined. As a result of the determination, when it is within the allowable range, the process proceeds to Step S20. As a result of the determination, when it is out of the allowable range, the process returns to Step S17, and the position control and the attitude control of the mobile node 20 are performed. In this case, the position control and the attitude control of the mobile node 20 are performed so as to decrease the error calculated in Step S18.

When the process proceeds to Step S20, the position information of the respective mobile nodes 20 is stored. As a storage destination of the position information, for example, the position information is stored in the recording unit 22.

Next, the process proceeds to Step S21, and it is determined whether the communication format is beamforming or MIMO. Consequently, the process proceeds to Step S22 in the case of beamforming, and the process proceeds to Step S28 in the case of MIMO.

When the process proceeds to Step S22, a beamforming parameter calculation process is performed. In this case, the communication parameter calculating unit 264*a* of the parameter calculating unit 264 calculates the optimal parameters of the amplitude and the phase necessary for performing the beamforming.

Next, the process proceeds to Step S23, and the service with the service requirement received in Step S11 starts to be provided. In this case, an actual service is provided through the communication by the beamforming based on the parameter calculated in Step S22.

Next, the process proceeds to Step S24, and a beamforming parameter update process is performed. Since various communication statuses and link statuses change in some cases while the service actually continues to be provided in Step S23, the beamforming parameter update process is performed by recalculating the optimal parameters of the amplitude and the phase necessary for performing the beamforming.

Next, the process proceeds to Step S25, and link information is monitored. Next, in Step S26, it is determined whether or not the monitored link information is within an allowable range. As a result, when it is within the allowable range, the process proceeds to Step S27. Meanwhile, when it is out of the allowable range, the process returns to Step S24, and the beamforming parameter update process is performed again.

When the process proceeds to Step S27, it is determined whether or not the provided service has ended. Consequently, when the provided service has ended, this flow ends. On the other hand, when the provided service has not ended yet, the processing operations of Step S23 and the following steps are repeatedly performed.

When the process proceeds to Step S28, an MIMO parameter calculation process is performed. In this case, the communication parameter calculating unit 264*a* of the parameter calculating unit 264 calculates the optimal parameters of the amplitude and the phase necessary for performing the MIMO.

Next, the process proceeds to Step S29, and the service with the service requirement received in Step S11 starts to be provided. In this case, the actual service is provided through the communication by the MIMO based on the parameter calculated in Step S28.

Next, the process proceeds to Step S30, and an MIMO parameter update process is performed. Since various communication statuses and link statuses change in some cases while the service actually continues to be provided in Step S29, the MIMO parameter update process is performed by recalculating the optimal parameters necessary for performing the MIMO.

Next, the process proceeds to Step S31, and link information is monitored. Next, in Step S32, it is determined whether or not the monitored link information is within an allowable range. As a result, when it is within the allowable range, the process proceeds to Step S33. Meanwhile, when it is out of the allowable range, the process returns to Step S30, and the beamforming parameter update process is performed again.

When the process proceeds to Step S33, it is determined whether or not the provided service has ended. Consequently, when the provided service has ended, this flow ends. On the other hand, when the provided service has not ended yet, the processing operations of Step S29 and the following steps are repeatedly performed.

Figure 19:
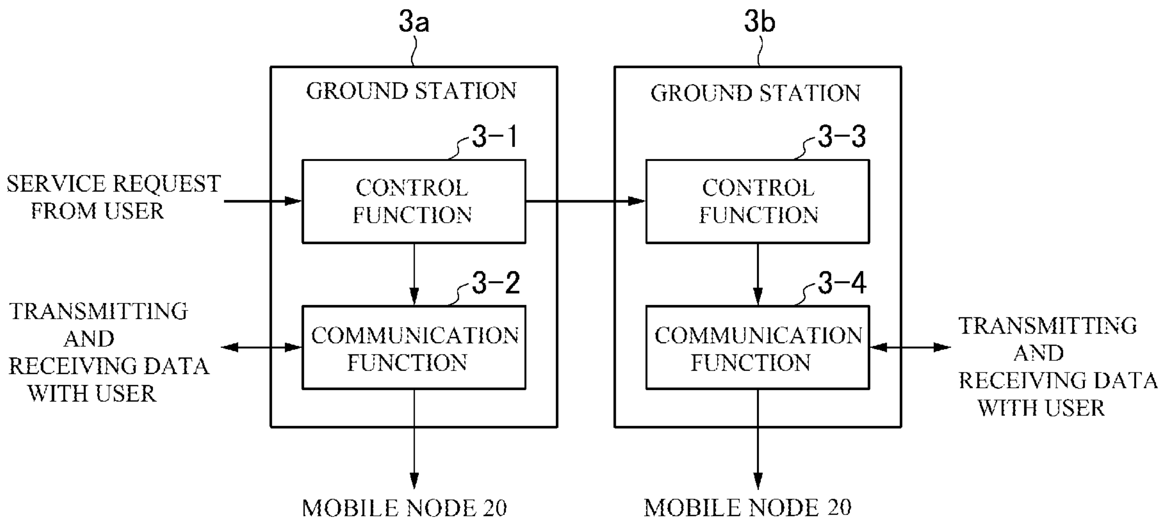
FIG. 19 is a diagram illustrating an example of a ground station that has received a service request from the user and a ground station to which a gateway station to be used belongs.

Next, the operation of the ground station 3 that has received the service request from the user on the ground will be described. As illustrated in FIG. 19, when a ground station 3*a* that has received the service request from the user and a ground station 3*b* to which a gateway station to be used belongs are present, the flowchart of FIG. 20 described below is an example of communication performed by the ground station 3*a*. Incidentally, in the ground station 3*a*, the service request from the user is received by a control function 3-1, and transmission and reception of data with the user is performed by a communication function 3-2. In the ground station 3*b*, under the control by a control function 3-3, the transmission and reception of data with the user is performed by a communication function 3-4.

Figure 20:
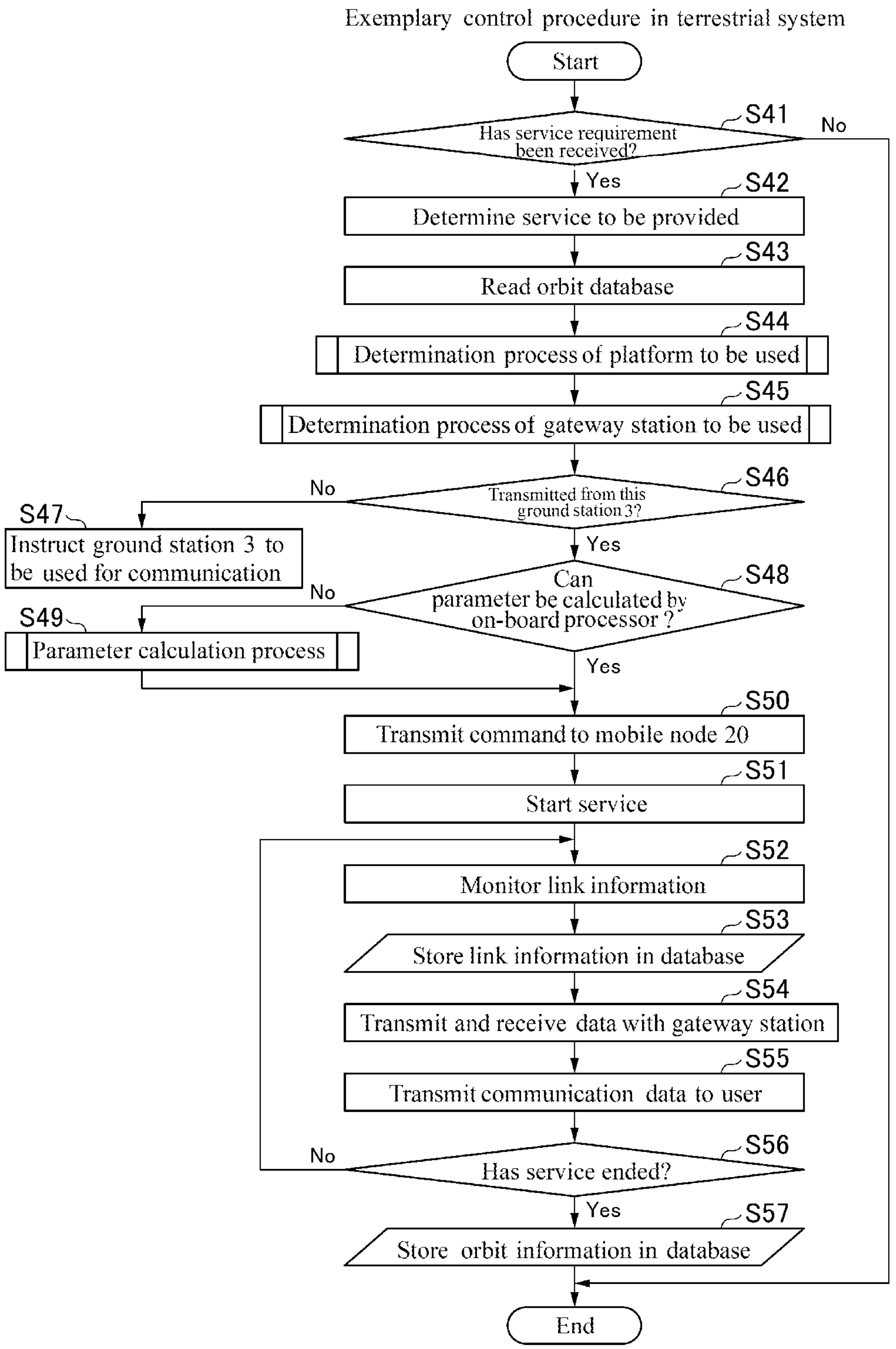
FIG. 20 is a flowchart for performing communication by the ground station.

As illustrated in FIG. 20, first, in Step S41, whether or not a service requirement has been received is determined. When the service requirement is received, the process proceeds to Step S42. On the other hand, when the service requirement fails to be received, the processing operation ends for the time being.

When the process proceeds to Step S42, control for determining the service to be actually provided is performed.

Next, the process proceeds to Step S43, and the parameter calculating unit 34 reads orbit data necessary for calculating various parameters from the orbit database 32.

Next, the process proceeds to Step S44, and a platform to be actually used is determined for connection from the respective mobile nodes 20 to the ground station 3, connection from the mobile node group 2 including the respective mobile nodes 20 to another mobile node group 2, or connection from the mobile node group 2 including the respective mobile nodes 20 to another mobile node 20.

Next, the process proceeds to Step S45, and a process of determining the gateway station to be used among the ground station 3*a*, the ground station 3*b*, . . . is performed. Next, the process proceeds to Step S46, and whether or not to perform communication by the ground station 3*a* is determined. When the communication is started by the ground station 3*a*, the process proceeds to Step S48. Meanwhile, when the communication is not performed by the ground station 3*a*, the process proceeds to Step S47, and the ground station 3 to be used for the communication is instructed. The processing operation after the process proceeds to Step S47 will be described later in detail using FIG. 21.

Next, the process proceeds to Step S48, it is determined whether or not various parameters can be calculated by the on-board processor in the mobile node 20 when wireless communication is performed with the mobile node 20. As a result, when the various parameters can be calculated by the on-board processor in the mobile node 20, the process proceeds to Step S50. Meanwhile, when the various parameters are not able to be calculated by the on-board processor in the mobile node 20, the process proceeds to Step S49.

When the process proceeds to Step S49, the ground station 3 calculates the parameters necessary for the communication by beamforming or MIMO via the parameter calculating unit 34, and transmits them to the mobile node 20. In this case, the link parameter calculating unit 341 calculates the optimal parameters of the amplitude and the phase necessary for performing beamforming, MIMO, or the like and the link parameter, such as a carrier frequency, a bandwidth, and output power, with reference to the link monitoring database 31.

When the process proceeds to Step S50, the ground station 3 transmits various commands necessary for starting the service to the mobile node 20. The command includes information necessary for the link control based on the link parameter calculated in Step S49 described above. The respective mobile nodes 20 in the mobile node group 2 receive the command including the information necessary for the link control from the ground station 3, thereby allowing the link control of the wireless communication between the ground station 3 and the mobile node 20, in addition to the link control of the wireless communication between the mobile nodes 20, under the initiative of the ground station 3 side.

Next, the process proceeds to Step S51, and the service is started. In this case, the ground station 3 monitors the link information (Step S52), and stores the monitored link information in the link monitoring database 31 (Step S53).

Next, the process proceeds to Step S54, and the ground station 3*a* transmits and receives data with the ground station 3*b* as the gateway station. Next, the process proceeds to Step S55, and communication data is transmitted from the ground station 3*b* to the user.

Next, the process proceeds to Step S56, and whether or not the service has ended is determined. As a result, when the service has ended, the process proceeds to Step S57. Meanwhile, when the service has not ended yet, the processing operations of Step S52 and the following steps are repeated.

When the process proceeds to Step S57, the parameter calculating unit 34 stores orbit data necessary for calculating various parameters in the orbit database 32. When the process of Step S57 ends, this flow itself ends.

Figure 21:
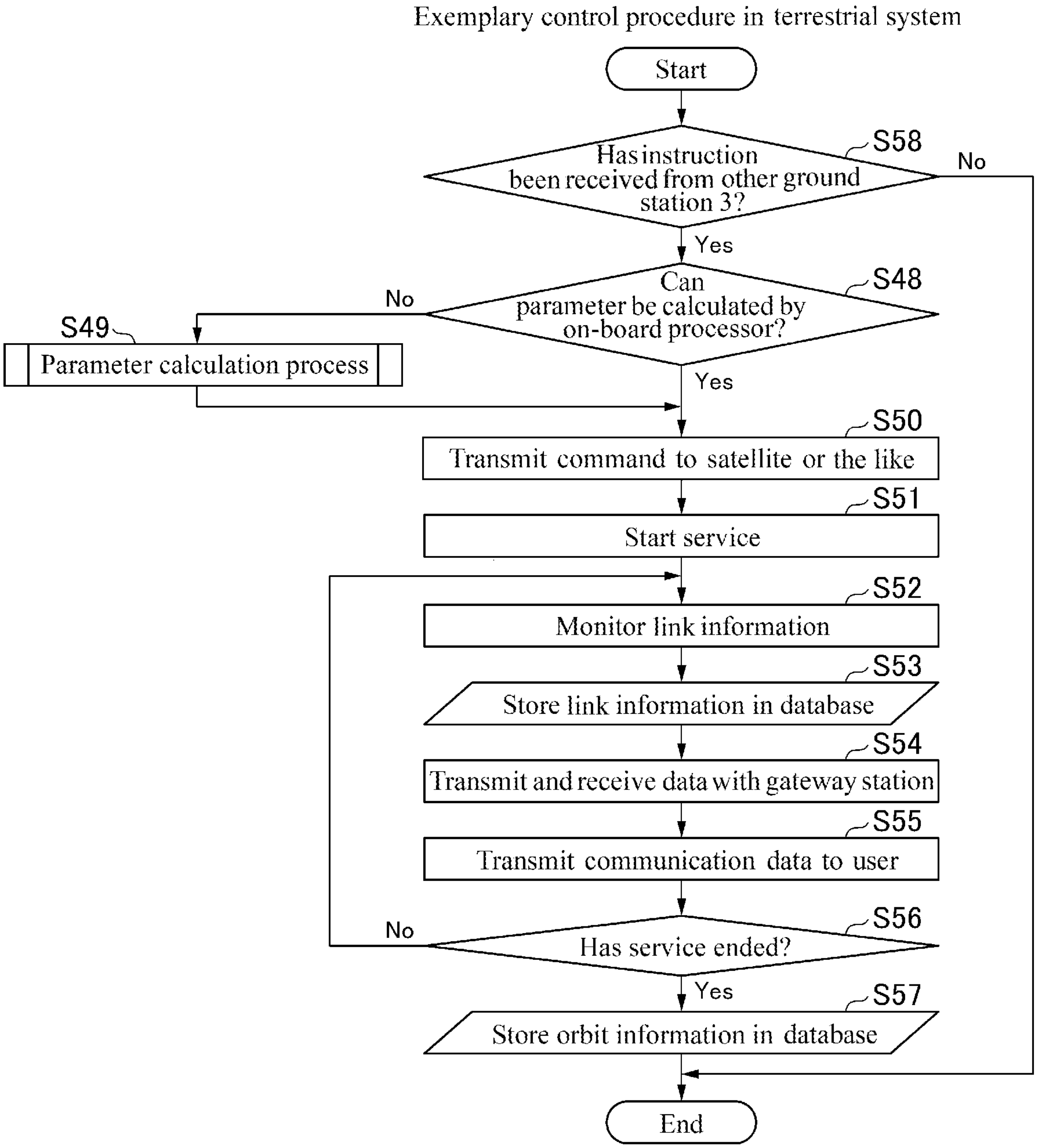
FIG. 21 is a flowchart when communication is performed by a ground station other than the ground station that has received the service request from the user.

FIG. 21 is a flowchart when the communication is performed by the ground station 3*b* other than the ground station 3*a* that has received the service request from the user.

First, in Step S58, the ground station 3*b* determines whether or not an instruction from the other ground station 3*a* has been received. In this case, in Step S47 of FIG. 20, it is determined whether or not the instruction has been transmitted to the ground station 3*b* itself as the ground station 3 used for the communication.

As a result, when the instruction has been transmitted to the ground station 3*b* itself as the ground station 3 used for the communication, the process proceeds to Step S48. Meanwhile, when the instruction has not been transmitted to the ground station 3*b* itself as the ground station 3 used for the communication, this flow ends.

Since the processing operation after the process proceeds to Step S48 is the same as the processing operation in FIG. 20, the same reference numerals and steps are attached, and the explanations will be omitted in the following description. However, when the process proceeds to Step S54, the step may be omitted in a case where the ground station 3*b* itself is the gateway station.

As described above, in the mobile node group control system 1 to which the present invention is applied, the mobile nodes are classified into the follower mobile node 20*b* and the leader mobile node 20*a* that collects the information on the follower mobile node 20*b* and controls it. Then, based on the on-board processor installed in the mobile node 20 side, the control of the follower mobile node 20*b* by the leader mobile node 20*a* and the control of the position or the attitude of itself for performing the formation flight are performed. Then, the link control of wireless communication between the ground station 3 and the mobile node 20 or the link control of wireless communication between the mobile nodes 20 is performed under the initiative of the ground station 3, and further, the selection of any of the ground stations 3*a*, 3*b*, . . . that wirelessly communicate with the mobile node 20 can also be controlled under the initiative of the ground station 3.

Among these various controls, the control of the follower mobile node 20*b* by the leader mobile node 20*a* and the control of the position or the attitude of itself for performing the formation flight are relatively largely influenced by delay and are relatively small in calculation amount. Therefore, the controls can be completed with only local information in the mobile node group 2 based on the on-board processor installed in the mobile node 20 side. Only these controls are performed by the mobile node 20 side.

On the other hand, the ground station 3 performs the control in which the influence of delay is relatively small, the calculation amount is relatively large, and global information, such as a terrestrial network and a usage use case, is required, for example, the link control of wireless communication between the ground station 3 and the mobile node 20, or the link control of wireless communication between the mobile nodes 20, and further the selection of any of the ground stations 3 that wirelessly communicate with the mobile node 20.

Accordingly, for the achievement of the formation flight by the mobile node group 2, the communication link can be flexibly controlled corresponding to the service requirement. This allows the flexible control of the communication link corresponding to the service requirement instead of designing the specialized system for each individual service each time, and therefore, the load on the user can be reduced.

In addition to this, according to the present invention, further, the control in which the influence of delay is relatively large, the calculation amount is relatively small, and the control can be completed with only the local information in the mobile node group 2 is performed based on the on-board processor installed in the mobile node 20 side. For example, the control of forming the mobile node group 2 (a cluster) with the other mobile node 20 and the control of time synchronization are included therein. Additionally, in the ground station 3 side, the control in which the calculation amount is relatively large, and global information, such as a terrestrial network and a usage use case, is required is performed. For example, the control of determining the service to be provided to the mobile node 20, and the control of changing the platform of the connection from the respective mobile nodes 20 to the ground station 3, the connection from the mobile node group 2 including the respective mobile nodes 20 to another mobile node group 2, or the connection from the mobile node group 2 including the respective mobile nodes 20 to another mobile node 20 are included therein. Accordingly, for the achievement of the formation flight by the mobile node group 2, the communication link can be further flexibly controlled corresponding to the service requirement.

DESCRIPTION OF REFERENCE SIGNS

1: Mobile node group control system
2: Mobile node group
3: Ground station
4: Earth observation remote sensing system
5: User
6: Deep space observation gravitational wave measurement system
7*a*: Lander
7*b*: Rover
8: Spaceplane
9: Space debris
20: Mobile node
21: Power supply unit
22: Recording unit
23: Data acquisition processing unit
24: Communication unit
25: Control unit
26: Time generating unit
31: Link monitoring database
32: Orbit database
33: Provided service function unit
34: Parameter calculating unit
35: Gateway station transmitting/receiving unit
36: Telemetry command transmitting/receiving unit
37: Communication data processing unit
241: RF receiver
242: Amplifier
243: Frequency converter
244: AD converter
245: Demodulation unit
246: Digital processing unit
248: Modulation unit
249: DA converter
250: Frequency converter
251: Amplifier
252: RF transmitter
261: Attitude control unit
262: Formation control unit
263: Time synchronization control unit
264: Parameter calculating unit
265: Orbit database
271: Transmitting/receiving unit
272: Telemetry command
272: Telemetry command transmitting/receiving unit
341: Link parameter calculating unit
342: Gateway station selection calculating unit
343: Connection destination platform change calculating unit

The invention claimed is:

1. A mobile node group control system that controls a mobile node group performing a formation flight, the system comprising:

mobile nodes constituting the mobile node group, the mobile nodes being classified into a follower mobile node and a leader mobile node that collects information on the follower mobile node and controls the follower mobile node, the mobile nodes wirelessly communicating with one another based on beamforming or MIMO; and a ground station that wirelessly communicates with each of the mobile nodes, wherein:

based on an on-board processor installed in the leader mobile node, the leader mobile node controls the follower mobile node, and each of the mobile nodes controls a position or an attitude of the mobile node itself for performing the formation flight, and the ground station performs:

link control of the wireless communication with the leader mobile node or link control of the wireless communication between the mobile nodes, control of selection of any ground station that wirelessly communicates with the leader mobile node, control of determination of a service to be provided to the leader mobile node, and control of changing of a platform of a connection from the respective moving bodies to the ground station, a connection from the mobile node group including the respective moving bodies to another mobile node group, or a connection from the mobile node group including the respective moving bodies to another mobile node.

2. The mobile node group control system according to claim 1, wherein the leader mobile node performs time synchronization control and mobile node group forming control for forming the mobile node group with another mobile node based on the installed on-board processor.

3. The mobile node group control system according to claim 1, wherein when the mobile node group fails to receive the service requirements for one or more of the following: weather observation, environment observation, a soil survey, a land use survey, and a forest survey, a processing operation ends, and when the mobile node group receives the service requirements, the ground station performs control for determining the service with the service requirements.

4. The mobile node group control system according to claim 1, wherein the leader mobile node performs time synchronization control and mobile node group forming control for forming the mobile node group with another mobile node based on the installed on-board processor, and the ground station performs control of determining a service to be provided to the mobile node, and control of changing a platform of a connection from the respective mobile nodes to the ground station, a connection from the mobile node group including the respective mobile nodes to another mobile node group, or a connection from the mobile node group including the respective mobile nodes to another mobile node.

5. The mobile node group control system according to claim 1, wherein each of the mobile nodes is an artificial satellite.

6. A communication device applied to the mobile node group control system according to claim 1, wherein the on-board processor performs the control of the follower mobile node by the leader mobile node and the control of the position or the attitude of each of the mobile nodes for performing the formation flight.

7. A communication device applied to the mobile node group control system according to claim 1, comprising:

control means installed in the ground station for performing the link control of the wireless communication with the leader mobile node or the link control of the wireless communication between the mobile nodes, and the control of selection of any ground station that wirelessly communicates with the leader mobile node.

8. The mobile node group control system according to claim 1, wherein the ground station receives a service requirement from a user on the ground.

9. The mobile node group control system according to claim 8, wherein the ground station performs, corresponding to the service requirement received from the user on the ground, the link control of the wireless communication with the leader mobile node or link control of the wireless communication between the mobile nodes, the control of selection of any ground station that wirelessly communicates with the leader mobile node, control of determination of a service to be provided to the leader mobile node, and control of changing of a platform of a connection from the respective moving bodies to the ground station, a connection from the mobile node group including the respective moving bodies to another mobile node group, or a connection from the mobile node group including the respective moving bodies to another mobile node.

10. A mobile node group control method for controlling a mobile node group that performs a formation flight, the method comprising:

performing control of a follower mobile node by a leader mobile node and control of a position or an attitude of each of the mobile nodes for performing the formation flight based on an on-board processor installed in the leader mobile node, the mobile nodes constituting the mobile node group, the mobile nodes being classified into the follower mobile node and the leader mobile node that collects information on the follower mobile node and controls the follower mobile node, the mobile nodes wirelessly communicating with one another based on beamforming or MIMO; and performing link control of wireless communication with the leader mobile node or link control of the wireless communication between the mobile nodes, control of selection of any ground station that wirelessly communicates with the leader mobile node, in a ground station that wirelessly communicates with each of the mobile nodes, control of determination of a service to be provided to the leader mobile node, and control of changing of a platform of a connection from the respective moving bodies to the ground station, a connection from the mobile node group including the respective moving bodies to another mobile node group, or a connection from the mobile node group including the respective moving bodies to another mobile node.

* * * * *